US011383561B2

(12) United States Patent
Royer (10) Patent No.: US 11,383,561 B2
(45) Date of Patent: Jul. 12, 2022

(54) CROWN ARCHITECTURE OF AN ELECTRICALLY CONDUCTIVE TIRE FOR A CIVIL ENGINEERING VEHICLE

(71) Applicant: COMPAGNIE GENERALE DES ETABLISSEMENTS MICHELIN, Clermont-Ferrand (FR)

(72) Inventor: Thierry Royer, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 61 days.

(21) Appl. No.: 16/956,224

(22) PCT Filed: Dec. 13, 2018

(86) PCT No.: PCT/FR2018/053254
§ 371 (c)(1),
(2) Date: Jun. 19, 2020

(87) PCT Pub. No.: WO2019/122618
PCT Pub. Date: Jun. 27, 2019

(65) Prior Publication Data
US 2021/0078370 A1    Mar. 18, 2021

(30) Foreign Application Priority Data

Dec. 21, 2017  (FR) ..................... 1762708

(51) Int. Cl.
*B60C 19/08*   (2006.01)
*B60C 1/00*    (2006.01)
(Continued)

(52) U.S. Cl.
CPC .......... *B60C 19/082* (2013.01); *B60C 1/0016* (2013.01); *B60C 1/0025* (2013.01);
(Continued)

(58) Field of Classification Search
CPC .............. B60C 11/0041; B60C 11/005; B60C 11/0058; B60C 11/0066; B60C 11/0075;
(Continued)

(56) References Cited

U.S. PATENT DOCUMENTS 5,227,425 A   7/1993  Rauline
5,679,728 A   10/1997 Kawazura et al.
(Continued)

FOREIGN PATENT DOCUMENTS

EP   0501227 A1   9/1992
EP   0711805 A1   5/1996
(Continued)

OTHER PUBLICATIONS

International Search Report dated Jan. 31, 2019, in corresponding PCT/FR2018/053254 (4 pages).

*Primary Examiner* — Justin R Fischer
(74) *Attorney, Agent, or Firm* — Venable LLP (57) ABSTRACT

The compromise between the performance aspects of endurance and wear of a tyre for construction plant vehicles is improved, while limiting the mean operating temperature thereof to an appropriate level of around 100° C., and while ensuring its capacity of being electrically conductive, that is to say of discharging electrostatic charges that have built up during running. For this purpose, the tread comprises three parts: two electrically conductive tread wings and a central portion that is optimized in terms of hysteresis and is therefore not electrically conductive. The pathway for discharging electrostatic charges connects the tread wings to the rim, passing via electrically conductive edging rubbers positioned at the axial ends of the layers of the crown.

6 Claims, 2 Drawing Sheets

(51) Int. Cl.
  *B60C 9/18*  (2006.01)
  *B60C 9/20*  (2006.01)
  *C08L 7/00*  (2006.01)
  *C08L 23/22*  (2006.01)

(52) U.S. Cl.
  CPC ............ *B60C 9/185* (2013.01); *B60C 9/2006* (2013.01); *B60C 19/084* (2013.01); *C08L 7/00* (2013.01); *C08L 23/22* (2013.01); *B60C 2009/2038* (2013.01); *B60C 2200/065* (2013.01)

(58) Field of Classification Search
  CPC ..... B60C 19/08; B60C 19/082; B60C 19/084; B60C 19/086; B60C 19/088
  See application file for complete search history.

(56) References Cited

U.S. PATENT DOCUMENTS

| | | | |
|---|---|---|---|
| 6,197,274 | B1 | 3/2001 | Mahmud et al. |
| 9,487,049 | B2 | 11/2016 | Lapra et al. |
| 10,308,073 | B2 | 6/2019 | Gervais et al. |
| 2004/0016495 | A1 | 1/2004 | Serra et al. |
| 2009/0297827 | A1 | 12/2009 | Lapra et al. |
| 2013/0158164 | A1 | 6/2013 | Morris et al. |
| 2014/0332132 | A1 | 11/2014 | Gervais et al. |
| 2020/0399442 | A1 | 12/2020 | Goncalves et al. |

FOREIGN PATENT DOCUMENTS

| | | | |
|---|---|---|---|
| EP | 838353 | * | 4/1998 |
| EP | 3 238 958 A1 | | 11/2017 |
| EP | 3238958 | * | 11/2017 |
| FR | 2888243 A1 | | 1/2007 |
| FR | 2 983 122 A1 | | 5/2013 |
| FR | 3 045 627 A1 | | 6/2017 |
| JP | 2-249706 | * | 10/1990 |
| WO | 98/13428 A1 | | 4/1998 |
| WO | 01/92039 A1 | | 12/2001 |
| WO | 2012/037244 A1 | | 3/2012 |
| WO | WO 2017/116834 | * | 7/2017 |

* cited by examiner

A radial tyre for a heavy vehicle of construction plant type is intended to be mounted on a rim, the diameter of which is at least equal to 25 inches, according to the European Tyre and Rim Technical Organisation or ETRTO standard. It is usually fitted to a heavy vehicle intended to support heavy loads and to run on rough ground such as stone-covered tracks.

Generally, since a tyre has a geometry exhibiting symmetry of revolution about an axis of rotation, its geometry is described in a meridian plane containing its axis of rotation. For a given meridian plane, the radial, axial and circumferential directions denote the directions perpendicular to the axis of rotation, parallel to the axis of rotation and perpendicular to the meridian plane, respectively.

In the following text, the expressions "radially inner/radially on the inside" and "radially outer/radially on the outside" mean "closer to" and "further away from the axis of rotation of the tyre", respectively. "Axially inner/axially on the inside" and "axially outer/axially on the outside" mean "closer to" and "further away from the equatorial plane of the tyre", respectively, with the equatorial plane of the tyre being the plane passing through the middle of the tread surface and perpendicular to the axis of rotation.

The top end of a component of the tyre refers to the radially outer end of said component. Conversely, the bottom end refers to the radially inner end of said component.

A tyre comprises a crown intended to come into contact with the ground via a tread, the two axial ends of which are connected via two sidewalls to two beads that provide the mechanical connection between the tyre and the rim on which it is intended to be mounted.

A radial tyre also comprises a reinforcement made up of a crown reinforcement radially on the inside of the tread and a carcass reinforcement radially on the inside of the crown reinforcement.

The crown reinforcement of a radial tyre comprises a superposition of circumferentially extending crown layers radially on the outside of the carcass reinforcement. Each crown layer is made up of usually metal reinforcers that are mutually parallel and coated in a polymeric material of the elastomer or elastomeric compound type. The assembly made up of the crown reinforcement and the tread is referred to as the crown.

The carcass reinforcement of a radial tyre customarily comprises at least one carcass layer comprising usually metal reinforcers that are coated in an elastomeric compound. A carcass layer comprises a main part that joins the two beads together and is generally wound, in each bead, from the inside of the tyre to the outside around a usually metal circumferential reinforcing element known as a bead wire so as to form a turn-up. The metal reinforcers of a carcass layer are substantially mutually parallel and form an angle of between 85° and 95° with the circumferential direction.

A tyre sidewall comprises at least one sidewall layer made up of an elastomeric compound and extending axially towards the inside of the tyre from an outer face of the tyre, in contact with the atmospheric air. At least in the region of greatest axial width of the tyre, the sidewall extends axially inwards as far as an axially outermost carcass layer of the carcass reinforcement.

An elastomeric compound is understood to be an elastomeric material obtained by blending its various constituents. An elastomeric compound conventionally comprises an elastomeric matrix comprising at least one diene elastomer of the natural or synthetic rubber type, at least one reinforcing filler of the carbon black type and/or of the silica type, a usually sulfur-based crosslinking system, and protective agents.

The quality of an elastomeric compound depends primarily on the quality of the blending of its various constituents, and in particular on the dispersion of the reinforcing filler within the elastomeric matrix.

In a known way, the dispersion of filler in an elastomeric matrix can be represented by the Z score, which is measured, after crosslinking, using the method described by S. Otto et al. in Kautschuk Gummi Kunststoffe, 58 Jahrgang, NR 7-8/2005, in accordance with the standard ISO 11345.

The calculation of the Z score is based on the percentage of surface area in which the filler is not dispersed ("% undispersed surface area"), as measured by the "disperGRADER+" device supplied, with its operating instructions and its "disperDATA" operating software, by Dynisco, according to the equation: $Z=100-(\%$ undispersed surface area)/0.35. The undispersed surface area percentage is, for its part, measured using a camera looking at the surface of the sample under incident light at 30°. The light points are associated with filler and agglomerates, while the dark points are associated with the rubber matrix; digital processing converts the image into a black and white image and makes it possible to determine the percentage of undispersed surface area, as described by S. Otto in the abovementioned document.

The higher the Z score, the better the dispersion of the filler in the elastomeric matrix (a Z score of 100 corresponding to a perfect dispersion and a Z score of 0 to a mediocre dispersion). A Z score greater than or equal to 80 will be considered to correspond to a surface area having a very good dispersion of the filler in the elastomeric matrix.

An elastomeric compound can be characterized mechanically, in particular after curing, by its dynamic properties, such as a dynamic shear modulus $G^*=(G'^2+G''^2)^{1/2}$, where $G'$ is the elastic shear modulus and $G''$ is the viscous shear modulus, and a dynamic loss $tg\delta=G''/G'$. The dynamic shear modulus $G^*$ and the dynamic loss $tg\delta$ are measured on a viscosity analyser of the Metravib VA4000 type according to the standard ASTM D 5992-96. The response of a sample of vulcanized elastomeric compound in the form of a cylindrical test specimen with a thickness of 4 mm and a cross section of 400 $mm^2$, subjected to sinusoidal loading in simple alternating shear stress at a frequency of 10 Hz, with a deformation amplitude sweep from 0.1% to 50% (outward cycle) and then from 50% to 0.1% (return cycle), and at a given temperature, for example equal to 60° C., is recorded. These dynamic properties are thus measured for a frequency equal to 10 Hz, a deformation equal to 50% of the peak-to-peak deformation amplitude, and a temperature that can be equal to 60° C. or 100° C.

An elastomeric compound can also be characterized by static mechanical properties. The tensile tests make it possible to determine the elasticity stresses and the properties at break. Unless indicated otherwise, they are carried out in accordance with the French standard NF T 46-002 of September 1988. The secant moduli known as "nominal" secant moduli (or apparent stresses, in MPa) at 10% elongation (denoted "MA10") and 100% elongation ("MA100") are measured in second elongation (i.e. after an accommodation cycle). All these tensile measurements are carried out under standard temperature (23±2° C.) and hygrometry (50±5% relative humidity) conditions, according to the French standard NF T 40-101 (December 1979). The breaking stresses (in MPa) and the elongations at break (in %) are also measured, at a temperature of 23° C.

An elastomeric compound can also be characterized by its electrical resistivity, which characterizes the ability of the compound to let the electric charges move freely, and therefore to allow an electric current to flow. The electrical resistivity is generally denoted p, and its unit of measurement is in ohm-metres (am), but it is normal, in the field of tyres, to express the measurement of electrical resistivity in ohm-centimetres ($\Omega \cdot cm$). The test for measuring electrical resistivity is described, for example, in the standard ASTM-D257. An electrical resistivity of 1 $\Omega \cdot m$, or of $10^2 \Omega \cdot cm$, corresponds to the resistance to the flow of electric current in a cylindrical portion of compound with a length of 1 m and a cross section of 1 $m^2$. Electrical conductivity is the inverse of electrical resistivity, denoted $\sigma$ and satisfying $\sigma = 1/p$. In the following text, either electrical conductivity $\sigma$ or electrical resistivity p will be used, depending on the context, to characterize the electrical properties of the compounds.

A material that is very weakly electrically conductive or electrically resistant is understood to be a material having an electrical resistivity greater than $10^8$ '$\Omega \cdot cm$. Similarly, a material that is electrically conductive is understood to be a material having a resistivity less than $10^6$ '$\Omega \cdot cm$. These materials may or may not be elastomeric compounds.

The electrical resistivity properties of the elastomeric compounds are directly linked to their composition and in particular to the use of reinforcing fillers. It is known that a quantity of 35 to 45 phr (parts per hundred parts of elastomer) of carbon black is sufficient to confer sufficient resistivity on an elastomeric compound to discharge electrostatic charges.

It is also known that a combination of reinforcing fillers of the carbon black type and of the silica type, in appropriate proportions, favours the achievement of a performance compromise between the rolling resistance and endurance of the tyre, by lowering the temperature level. However, if the quantity of carbon black is less than 35 phr, the elastomeric compound is electrically insulating.

By way of illustration, a tread elastomeric compound with a reinforcing filler comprising at least 40 phr of silica and at most 10 phr of carbon black has an electrical resistivity of around $10^{12}$ '$\Omega \cdot cm$.

In order to improve the rolling resistance and thus to reduce the fuel consumption, tyres on the market often comprise elastomeric compounds that predominantly comprise reinforcing fillers that are not electrically conductive, such as silica, or elastomeric compounds that have a small load of electrically conductive reinforcing filler such as carbon black.

The use of these elastomeric compounds has thus been widely developed for the creation of treads, given the advantages afforded by such compounds for also improving the performance aspects relating to grip on dry, wet or icy ground, or to running noise. This type of tyre is described by way of illustration in the European Patent Application EP 0 501 227.

However, the use of these elastomeric compounds has been accompanied by a difficulty associated with the build-up of static electricity while the vehicle is running, and with the absence of flow of these charges to the ground on account of the very high resistivity of the elastomeric compounds that make up said tread. The static electricity that has thus built up in a tyre is likely, given the combination of certain particular conditions, to result in the occupant of a vehicle experiencing an electric shock when they touch the bodywork of the vehicle. Moreover, this static electricity is likely to accelerate the ageing of the tyre on account of the ozone generated by the electric discharge. Depending on the nature of the ground and of the vehicle, it may also be the cause of poor operation of the radio installed in the vehicle on account of the interference it generates.

This is why numerous technical solutions have been proposed to allow the electric charges to flow between the crown of the tyre and the ground.

However, these known technical solutions usually consist in joining the tread to a portion of the tyre, such as the sidewall, a crown reinforcement layer or a carcass reinforcement layer, said tyre portion being sufficiently electrically conductive. The electric charges are thus discharged to the ground from the rim, connected to the vehicle, by passing successively through the beads of the tyre in contact with the rim, the components of the sidewalls, more particularly the elastomeric coating compound of the carcass layer reinforcers or at least one sidewall elastomeric compound, and finally the crown reinforcement and the tread.

Optimizing the endurance of the crown of a tyre for a construction plant vehicle makes it necessary to maintain the operating temperature of the crown at an appropriate level. The control of the temperature level is directly linked with the viscoelastic properties of the compounds, which depend on the composition thereof, and in particular on the quantity of reinforcing fillers.

On the other hand, it is known that lowering the mean operating temperature of the construction plant tyre is incompatible with an improvement in wear. A person skilled in the art knows how to lower the heat of the tread of construction plant tyres by reducing the content of fillers in the composition of the tread. However, this reduction in the content of filler causes a deterioration in wear resistance.

In order to obtain the optimum reinforcing properties conferred by a filler in a tyre tread and thus high wear resistance, it is known to be generally advisable for this filler to be present in the elastomeric matrix in a final form that is both as finely divided as possible and as homogeneously distributed as possible. However, such conditions can be achieved only inasmuch as this filler exhibits a very good ability both to be incorporated in the matrix during mixing with the elastomer without forming agglomerates, and to be dispersed homogeneously in this elastomeric matrix.

As is known, carbon black exhibits such optimal reinforcing properties, this not generally being the case with inorganic fillers, in particular silicas. This is because, for reciprocal affinity reasons, these inorganic filler particles tend to clump together in the elastomeric matrix. These interactions have the negative consequence of limiting the dispersion of the filler and thus the reinforcing properties to a level substantially lower than that which it would be theoretically possible to achieve if all the (inorganic filler/elastomer) bonds capable of being created during the compounding operation were actually obtained. These interactions moreover tend to increase the consistency in the raw state of the rubber compositions and thus to make their processability more difficult than in the presence of carbon black.

There is therefore a need to have a filler, providing the hysteresis level of silica and the reinforcing character of a filler such as carbon black, in rubber compositions.

This is why reinforcing fillers covered at least partially by silica are particularly beneficial, in particular reinforcing fillers consisting of carbon black covered at least partially by silica, as described in particular in the publications WO98/13428 and EP 0 711 805, or reinforcing fillers consisting of metal oxide covered at least partially by silica, as described in particular in the publication FR2888243.

The advantage of using fillers covered at the surface by a silica, in particular with a high specific surface area, lies mainly in the possibility of increasing the number of bonds of the silica with the elastomer and therefore of increasing the level of reinforcement thereof.

In a tyre for a construction plant vehicle, the tread represents around 35% to 40% of the total volume of rubber of the tyre, and the sidewalls represent around 15% of this same volume. The tread being subjected to the shear forces of the ground is the site of large-amplitude deformations. The inventors have therefore focused on this region of strong mechanical loading to determine the optimal composition of the elastomeric compound of the tread in order to achieve the desired compromise between the performance aspects of endurance and wear with a controlled mean operating temperature.

The wear resistance tests, or wear tests, are carried out on tyres of size 15.5R20 with two tyres mounted on the rear axle of a truck, inflated to their nominal pressure and subjected to their nominal load, the nominal load and pressure conditions being defined by the usual standards, such as the ETRTO standard. These wear tests are carried out for two tyres of a control composition T and for two tyres of a composition I according to the invention. These wear tests are carried out, at a mean speed of 24 km/h, on a track covered with gravel of porphyry type of a circuit comprising uphill sections and downhill sections. The criterion for stopping such a wear test is either the achievement of a minimum level of wear at the tread edge, characterized by a residual tread height equal to 12 mm, or a maximum running time, set at 1200 hours, for the control composition T. The wear performance, expressed in base 100, of the control is calculated by the ratio between the mean loss of height, measured for the two tyres of the control composition T, and the mean loss of height for the two tyres of the composition I. An index of greater than 100 indicates an improved wear performance for the tyres of composition I compared with the tyres of composition T.

The inventors therefore set themselves the objective of improving the compromise between the performance aspects of endurance and wear of a tyre for a construction plant vehicle, while limiting the mean operating temperature thereof to an appropriate level of around 100° C., and while ensuring its capacity of being electrically conductive, that is to say of discharging electrostatic charges.

SUMMARY

This objective has been achieved by a tyre for a heavy vehicle of construction plant type, comprising:
- a tread comprising two axial end portions or tread wings that are axially separated by a tread central portion;
- at least one tread wing being made up of an electrically conductive elastomeric compound;
- a protective reinforcement, radially on the inside of the tread, comprising at least one protective layer made up of metal reinforcers coated in an electrically conductive elastomeric coating compound;
- said protective layer being bordered at each of its axial ends by an edging rubber having a curved width $L_{GBS1}$ and being made up of an elastomeric compound;
- a working reinforcement, radially on the inside of the protective reinforcement, comprising at least two working layers made up of metal reinforcers coated in an elastomeric coating compound;
- two sidewalls connecting the tread wings to two beads that are intended to come into contact with a mounting rim via a bead layer made up of an electrically conductive elastomeric compound;
- a carcass reinforcement connecting the two beads together, passing via the sidewalls, and comprising at least one carcass layer made up of metal reinforcers coated in an electrically conductive elastomeric coating compound;
- each compound having a viscoelastic loss tgδ defined as being the ratio of the viscous shear modulus to the elastic shear modulus, the moduli being measured at a frequency of 10 Hz for a temperature of 60° C.;
- the elastomeric compound of the central portion of the tread having a composition based on an elastomeric matrix comprising at least one diene elastomer and on a reinforcing filler predominantly comprising a filler covered at least partially with silica, with a dispersion of the reinforcing filler in the elastomeric matrix having a Z score greater than or equal to 70;
- the edging rubber of the protective layer being at least partially in contact with the elastomeric coating compound of said protective layer and with the axially closest tread wing;
- the electrical resistivities of the elastomeric compound of said tread wing and of the elastomeric compound of the edging rubber of the protective layer, respectively, being at most equal to $10^6$ a cm, such that the tread wing, the edging rubber of the protective layer, the elastomeric coating compounds of the protective layers, the working layers, the carcass layer and the bead layer, respectively, constitute a preferential conductive pathway for the electric charges between the ground and the rim when the tyre is mounted on its rim and squashed on the ground.

BRIEF DESCRIPTION OF THE DRAWINGS

The invention will be better understood on reading the following description, given solely by way of non-limiting example and with reference to the drawings, in which.

DETAILED DESCRIPTION

The essential idea of the invention is to optimize the formulation of the elastomeric material of the tread in respect of hysteresis. The tread is therefore divided into three portions: a central portion and two tread wings situated axially on either side of the central part. The central portion of the tread, which is optimized in terms of hysteresis, is therefore not electrically conductive. It is thus appropriate to use an electrically conductive compound for the tread wings. In order to ensure that there is an electrically conductive pathway running from the tread to the rim, the edging rubbers of the protective layers are formulated so as to ensure their usual function of blocking shear stresses while having electrically conductive properties. The invention makes it possible to provide a solution for the desired compromise as regards the performance aspects of endurance and wear, while being electrically conductive and without the addition of additional materials.

According to the invention, the elastomeric compound of the central portion of the tread has a composition based on an elastomeric matrix comprising at least one diene elastomer and on a reinforcing filler predominantly comprising a filler covered at least partially with silica, with a dispersion of the reinforcing filler in the elastomeric matrix having a Z score greater than or equal to 70.

In a tyre for a construction plant vehicle, the tread represents around 35% to 40% of the total volume of rubber of the tyre. It is therefore the main area to be optimized for the desired compromise in terms of wear and endurance. The inventors have demonstrated that tyres used for construction plant vehicles, the tread of which comprises compositions based on diene elastomer and on filler covered at least partially with silica, and exhibiting a very good dispersion of the reinforcing filler in the elastomeric matrix, made it possible to obtain tyres not only exhibiting improved thermal properties but also exhibiting improved wear resistance properties.

In order to obtain a good dispersion of the filler in the elastomeric matrix, it is possible in particular to mix the elastomer and the filler in the "liquid" phase. To do this, use is made of an elastomer in the form of latex which is in the form of elastomer particles dispersed in water, and of an aqueous dispersion of the filler, i.e. a filler dispersed in water, commonly referred to as a "slurry". Certain processes in particular, such as those described in the document U.S. Pat. No. 6,048,923, make it possible to obtain a masterbatch of elastomer and filler that has a very good dispersion of the filler in the elastomeric matrix, which is greatly improved compared with the dispersion of the filler in the elastomeric matrix that can be obtained during the solid-phase mixing of elastomer and reinforcing filler, which are also suitable for reinforcing fillers covered at least partially with silica, as shown in the document WO 2012/037244.

Proceeding from the above-described process, the dispersion of the filler in the elastomeric matrix of the compound of the central portion of the tread has a Z score greater than or equal to 70, the dispersion being measured in accordance with the method described above.

Also according to the invention, the edging rubber of the protective layer is at least partially in contact with the elastomeric coating compound of said protective layer and with the axially closest tread wing.

The edging rubber of the protective layers connects the tread wings in contact with the ground to the elastomeric coating compound of the protective layers.

However, in tyre mechanics, the edging rubbers are known for their function of blocking shear stresses at the axial end of the layers of the crown. A running tyre is the site of large-amplitude cyclic shear stresses at the axial ends of the crown layers caused by the periodic flattening of the tread. Crack initiators can develop in this zone, and propagate in the axial direction of the meridian plane. This phenomenon is widely described in the prior art as being a cleavage that arises between the layers of the crown and can, in the worst case, result in deterioration of the tyre. Crack initiators can also propagate in the circumferential direction in a plane parallel to the equatorial plane. In the prior art, this phenomenon is known as detachment, since the shear stresses in this direction separate the reinforcers from the elastomeric coating compound.

The inventors wished to preserve the function of blocking shear stresses of the edging rubbers while giving them additional properties of low electrical resistivity. Thus, the Shore A hardness of the edging rubbers is very high with a level greater than 67, while having an electrical resistivity of less than $10^6$ ohm·cm.

Still according to the invention, the electrical resistivities of the elastomeric compound of said tread wing and of the elastomeric compound of the edging rubber of the protective layer, respectively, are at most equal to $10^6$ 'Ω·cm, such that the tread wing, the edging rubber of the protective layer, the elastomeric coating compounds of the protective layers, the working layers, the carcass layer and the bead layer, respectively, constitute a preferential conductive pathway for the electric charges between the ground and the rim when the tyre is mounted on its rim and squashed on the ground.

The compound of the central portion of the tread, which is optimized with low hysteresis, has a very high electrical resistivity with a value greater than $10^{11}$ ohm·cm. The objective of obtaining an electrically conductive tyre results in the proper functioning of the pathway for discharging electrostatic charges. The interfaces of the various constituents of the pathway for discharging electrostatic charges have to be in contact in pairs along a length of at least 10 mm, so as to always ensure the continuity of the pathway for discharging electrostatic charges in order to take account of manufacturing tolerances.

According to the inventors, an additional function of the edging rubber of the protective layers is that of being a link in the pathway for conducting electrostatic charges from the tread to the rim, passing through the elastomeric coating compounds of the crown layers and of the carcass of the tyre.

According to one embodiment of the invention, the edging rubber of the protective layer has a curved width $L_{GBS1}$ at least equal to 100 mm and at most equal to 350 mm, and it has a thickness at least equal to 3 mm and at most equal to 20 mm, measured at its middle along the direction normal to the curve of the carcass.

The edging rubber of the protective layers has to have mechanical properties and a geometry that are appropriate for the stresses experienced. Furthermore, its width has to be sufficiently great to always remain in contact with the tread wing on the radially outer side, regardless of the manufacturing vagaries, and subsequently throughout the lifetime of the tyre. From a mechanical point of view, the invention produces results as expected when the edging rubber has a Shore A hardness greater than or equal to 60, a static stiffness at 10% deformation (MA10) greater than or equal to 4.5 MPa, and at 100% deformation (MA100) greater than or equal to 2.0 MPa. The static stiffness moduli MA10 and MA100 are measured using the method described above.

According to a preferred embodiment of the invention, the elastomeric compound of the tread central portion has a viscoelastic loss at most equal to 0.065.

In a construction plant tyre, the tread represents around 40% of the total volume of rubber, and, as a result, is the main source of hysteresis. In order to improve endurance, one of the solutions consists in obtaining elastomeric compounds with very low hysteresis in order to limit the temperature level. By doing away with the need to have an electrically conductive compound for the central portion of the tread, the composition can be focused on the reduction in hysteresis. In this way, a viscoelastic dynamic loss characterized by $\tan(\delta_{max})$ of around 0.06, measured at 100° C.

and for a stress frequency of 10 Hz, is obtained. The elastomeric compound of the tread central portion consequently has low hysteresis while having compatible properties for the performance aspects of wear and grip.

According to one embodiment of the invention, the elastomeric compound of at least one tread wing is an electrically conductive rubber composition based on at least polyisoprene, on a crosslinking system, and on at least one reinforcing filler comprising carbon black, characterized by a BET surface area at least equal to 110 m$^2$/g and by a content at least equal to 30 phr and at most equal to 80 phr.

The tread wings are made up of an elastomeric compound intended to be in contact with the ground. In addition to the expected electrical properties, the composition of the elastomeric compound needs to be compatible with the performance requirements of grip and wear of the tyre. The tread wings thus have a sufficient thickness to be in contact with the ground throughout the lifetime of the tyre. The reinforcing fillers of this elastomeric compound are in a sufficient quantity, with a content of carbon black of 30 to 80 phr, and of appropriate quality, with a BET surface area greater than 110 m$^2$/g, to ensure the electrical conductivity of this elastomeric compound. As is known, the BET specific surface area of carbon blacks is measured according to the standard D6556-10 [multipoint method (a minimum of 5 points)—gas: nitrogen—relative pressure P/PO range: 0.1 to 0.3].

According to a preferred embodiment of the invention, the elastomeric compound of each sidewall has a rubber composition based on at least one blend of polyisoprene, natural rubber or synthetic polyisoprene, and polybutadiene, on a crosslinking system, and on a reinforcing filler, at an overall content at most equal to 45 phr, and comprising carbon black, at a content at most equal to 5 phr, and, predominantly, silica, at a content at least equal to 20 phr and at most equal to 40 phr.

The sidewalls, after the tread, constitute a significant hysteresis source area, and so the composition of this elastomeric compound has to result in the reduction in hysteresis. However, this drop in hysteresis should be able to be achieved without adversely affecting, in particular, the mechanical properties such as fatigue strength and, more particularly, crack resistance. Specifically, the sidewalls of construction plant tyres are subjected to very high stresses, in terms of flexural deformation, attack and also thermal stresses. These prolonged static or dynamic stresses of the sidewalls in the presence of ozone cause more or less pronounced crazing or cracks to arise, the propagation of which under the effect of the stresses may give rise to significant damage to the sidewall in question. It is therefore important that the elastomeric compounds that make up the sidewalls of tyres, for construction plant vehicles in particular, have very good mechanical properties, conferred in particular by a high content of reinforcing fillers.

According to one embodiment of the invention, the elastomeric compound of the sidewalls has a viscous shear modulus at most equal to 0.125 MPa.

In a tyre for a construction plant vehicle, the mass of elastomeric compounds of the sidewall is around 15% of the total mass of compounds of the tyre. The option selected by the inventors is to have an elastomeric compound for the sidewall of low hysteresis with a viscous shear modulus set at 0.125 MPa. Since the sidewall is not involved in the pathway for conducting electrostatic charges, there is therefore no need to fill the compound with for example carbon black. Thus, a filler with mainly silica at a level of 29 phr, as opposed to 3 phr of carbon black, is used to achieve the aim of low hysteresis.

Figure 1:
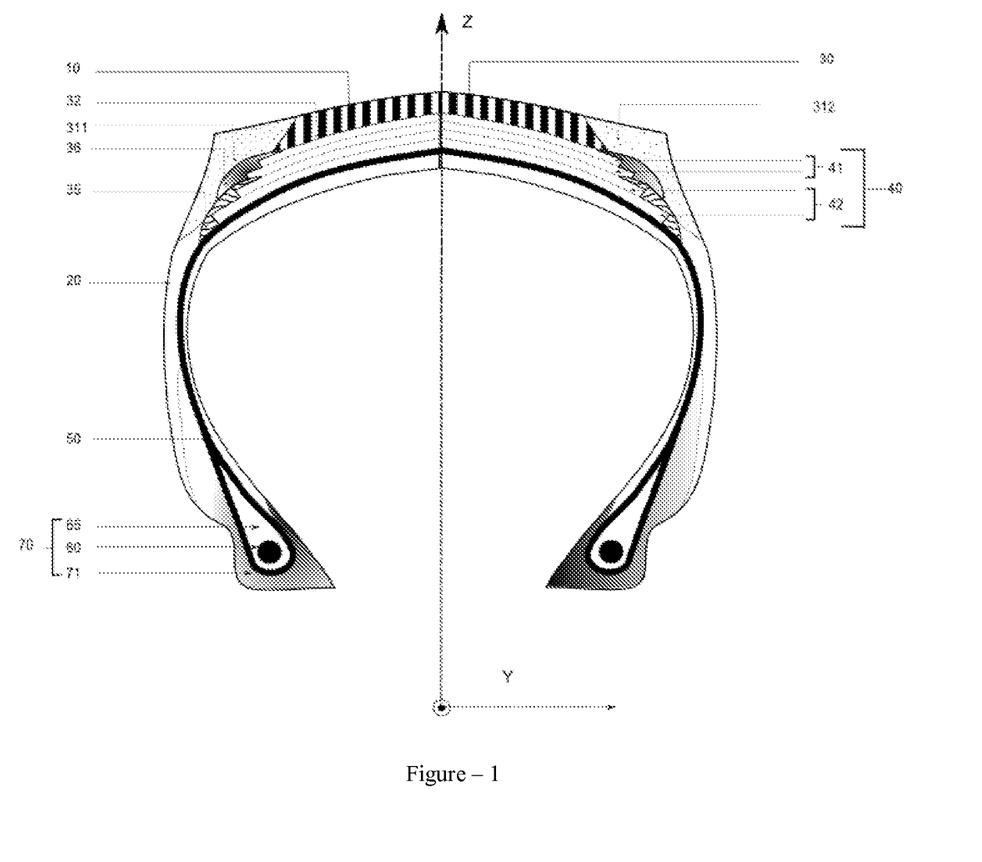
FIG. 1 schematically shows a tyre 10 intended to be used on dumper type vehicles.

The architecture of the tyre according to the invention will be understood better with reference to FIG. 1, not to scale, which shows a meridian half-section of a tyre that is symmetric about the equatorial plane containing the axis (OZ).

FIG. 1 schematically shows a tyre 10 intended to be used on dumper type vehicles.

Figure 2:
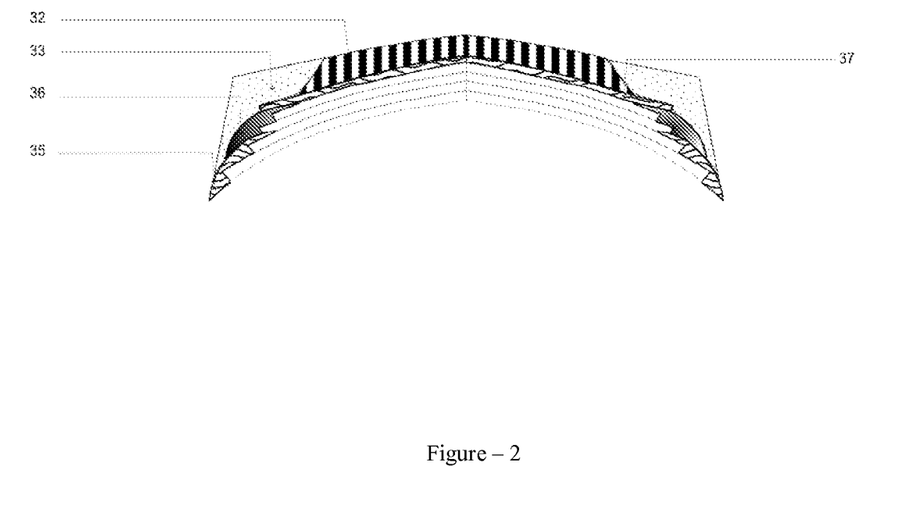
FIG. 2 shows a configuration of the invention in which the wings and the central portion of the tread have been laid on a base layer 37, radially on the inside of the tread.

FIG. 2 shows a configuration of the invention in which the wings and the central portion of the tread have been laid on a base layer 37, radially on the inside of the tread.

In FIG. 1, the tyre 10 comprises a radial carcass reinforcement 50 that is anchored in two beads 70 and turned up, in each bead, around a bead wire 60. Each bead 70 comprises a bead layer 71 intended to come into contact with a rim flange. The carcass reinforcement 50 is generally formed of a single carcass layer made up of metal cords coated in an electrically conductive elastomeric coating compound. Positioned radially on the outside of the carcass reinforcement 50 is a crown reinforcement 40, itself radially on the inside of a tread 30. The tread 30 comprises, at each axial end, an axial end portion or tread wings 311 and 312. Each axial end portion 311, 312 of the tread is connected to a bead 70 by a sidewall 20. The crown reinforcement 40 is made up of a protective reinforcement that is made up of two protective layers 41 and is radially on the inside of the tread 30. The crown reinforcement also comprises a working reinforcement radially on the inside of the protective reinforcement and comprising working layers 42.

The protective layers 41 are bordered at their axial ends by an edging rubber 36 on either side of the axis of symmetry (OZ). This edging rubber 36 is in contact with the tread wing 311, 312 along its entire axially outer edge.

The working layers 42 are bordered at their axial ends by an edging rubber 35 on either side of the axis of symmetry (OZ).

The top, radially outer, end of the tread wing 31 is in contact with the tread central portion 32 over its entire thickness. Its bottom, radially inner, end is in contact with the edging rubber 36.

The objective is to ensure permanent contact between the electrically conductive elastomeric compounds, in pairs, in order to ensure the continuity of the pathway for discharging electrostatic charges, taking account of the manufacturing tolerances.

FIG. 2 shows a tread that is symmetric about the equatorial plane and comprises two axial end portions or tread wings that are axially separated by a central portion. The entire tread, namely the wings plus the central portion, is laid on a base layer 37.

The edging rubbers are not necessarily made of the same elastomeric material. The curved length of the edging rubber of the protective layers is denoted $L_{GBS1}$.

The invention was studied more particularly in the case of a tyre for a dumper type vehicle, of size 59/80 R63, according to the invention, and as shown in FIG. 1.

The results of the invention were found on a tyre produced according to the invention and compared with the simulation results obtained on a reference tyre of the same size, comprising a one-piece tread, according to the prior art. In the case of the reference tyre, the electrostatic charges are discharged by the tread, which is electrically conductive.

Table 1 below shows an example of the composition of the elastomeric compound of such a standard electrically conductive tread:

TABLE 1

| Compositions | Elastomer NR (Natural Rubber) | Carbon black N234 | Silica (1) | Antioxidant | Paraffin | Stearic acid | ZnO | Accelerator | Sulfur |
|---|---|---|---|---|---|---|---|---|---|
| Tread of the reference tyre | 100 | 35 | 10 | 3 | 1 | 2.5 | 2.7 | 1.4 | 1.25 |

(1) Zeosil 1165MP silica, sold by Rhodia

Still on the reference tyre, the composition of the elastomeric compound of the sidewall is standard, as indicated below in Table 2:

TABLE 2

| Composition | Elastomer NR (Natural Rubber) | Elastomer BR (Butadiene Rubber) | Carbon black N330 | Plasticizer (1) | Wax | Antioxidant | ZnO | Stearic acid | Sulfur | Accelerator |
|---|---|---|---|---|---|---|---|---|---|---|
| Elastomeric compound of the sidewall of the reference tyre | 50 | 50 | 55 | 18 | 1 | 3 | 2.5 | 1 | 0.9 | 0.6 |

(1) TDAE oil, Vivatec 500 from Klaus Dahleke

For the tyre according to the invention, the inventors proposed the following compositions of the elastomeric compounds of the edgings of the protective layers and working layers, compiled in Table 3:

TABLE 3

| Composition | Elastomer NR (Natural Rubber) | Carbon black N326 | Antioxidant | ZnO | Stearic acid | Sulfur | DCBS | OPF Epoxy resin | Cobalt salt | CTP |
|---|---|---|---|---|---|---|---|---|---|---|
| Elastomeric compound of the edging of the protective and working layers | 100 | 47 | 1.5 | 7.5 | 0.9 | 5.63 | 0.8 | 0.5 | 1.5 | 0.15 |

The same elastomeric compound is therefore used for the edgings of the protective layers and the working layers. This compound needs to have mechanical properties suitable for the function of blocking shear stresses at the axial ends of the protective layers and working layers, as set out in Table 4 below:

TABLE 4

| Results | Elastomeric compound of the edging of the protective and working layers |
|---|---|
| Electrical resistivity Log (Ω · cm) | 5.2 |
| Shore A | 67 |
| MA10 | 5.2 MPa |
| MA100 | 2.6 MPa |

The mechanical properties are consistent with those expected, and the electrical resistivity of less than $10^6$ ohm·cm ensures that this compound is electrically conductive.

The wings of the tread need to be an electrically conductive portion, and the central portion needs to be optimized in terms of hysteresis. Table 5 gives examples of compositions:

TABLE 5

| Compositions | Elastomer NR (Natural Rubber) | Carbon black (1) | Black covered with silica (2) | Antioxidant (3) | Paraffin | Stearic acid | ZnO (4) | Accelerator (5) | Sulfur |
|---|---|---|---|---|---|---|---|---|---|
| Wings of the tread (ML20874) | 100 | 50 | NA | 1.5 | 1 | 1 | 2.7 | 1.7 | 1.2 |
| Central portion of the tread | 100 | NA | 50 | 1.5 | 1 | 1 | 2.7 | 1.7 | 1.2 |

(1) N134, sold by Cabot Corporation
(2) CRX2125, sold by Cabot Corporation
(3) N-(1,3-Dimethylbutyl)-N-phenyl-para-phenylenediamine, Santoflex 6-PPD, sold by Flexsys
(4) Industrial grade zinc oxide, sold by Umicore
(5) N-Cyclohexyl-2-benzothiazolesulfenamide, Santocure CBS, sold by Flexsys The properties of these elastomeric compounds, which are measured on test specimens and result from the choices of chemical composition, are compiled in Table 6:

TABLE 6

| Properties | Elastomeric compound of the tread wing[1] | Elastomeric compound of the tread central portion |
|---|---|---|
| Electrical resistivity in Log (Ω · cm) | 5.7 | >11.6 |
| Z score | 52 | 88 |
| Tan$\delta_{max\ return}$ | 0.126 | 0.062 |
| Wear performance | 100 | 117 |

[1]On the reference tyre, the tread is made of this same compound

In a construction plant tyre, the quantity of elastomeric compound of the tread represents around 35% to 40% of the total mass of elastomeric compounds of the tyre. The tread is thus one of the main sources of hysteresis, and therefore it contributes greatly to the increase in temperature of the tyre. Consequently, the elastomeric compound of the central portion of the tread is designed to have low hysteresis with a dynamic viscoelastic dissipation of around 0.062 measured in tan $\delta_{max\ return}$, for a temperature of 100° C. and for a frequency of 10 Hz.

The elastomeric compound of the tread central portion has a composition based on at least one diene elastomer, a reinforcing filler predominantly comprising a filler covered at least partially with silica, an agent for coupling the filler to the elastomer and a crosslinking system, characterized in that the dispersion of the filler in the elastomeric matrix has a Z score greater than or equal to 70.

The inventors have demonstrated clear synergy of the combination of a filler covered with silica with its very good dispersion of the composition, for obtaining a tyre for a heavy vehicle of construction plant type that exhibits both improved rolling resistance and improved wear resistance properties.

In this embodiment, the tread central portion is electrically insulating. Electrostatic charges are thus discharged along the conduction pathway defined by the invention, which passes via the tread wings that are in contact with the ground and are always electrically conductive.

For the elastomeric compound of the tread wings, with the overall filler content being 45 phr, with 35 phr of carbon black and 10 phr of silica, this ensures an electrical resistivity less than or equal to $10^6$ 'Ω·cm. The same elastomeric compound is used for the two tread wings positioned at the two ends of the tread, but the invention still remains valid if different materials are used. The condition imposed is that of having at least, at one of the two axial ends of the tread, an elastomeric compound having an electrical resistivity less than or equal to $10^6$ 'Ω·cm.

The results on tyres were obtained by finite-element calculations in order to determine the viscoelastic heat sources, the temperature and the electrical resistance.

Finite-element calculations were carried out on the tyre of the invention and the reference tyre.

The standard tread of the reference tyre does not comprise tread wings or a base layer. It is in one piece.

The results of calculations for the reference tyre are shown below in Table 7:

TABLE 7

| Results | Reference tyre |
|---|---|
| Electrical resistance of the tyre | <1 Megaohm |
| Viscoelastic sources (total of the tyre) | 21 kW |
| Maximum temperature ° C. | 109° C. |

The reference tyre is electrically conductive with a maximum operating temperature of around 109° C.

For the tyre of the invention, the results of finite-element calculations are summarized in Table 8:

TABLE 8

| Results | Tyre of the invention |
|---|---|
| Electrical resistance | <10 Megaohm |
| Viscoelastic sources (total of the tyre) | 180 kW |
| Maximum temperature ° C. | 100° C. |

The tread wings in contact with the ground and the sublayer are electrically conductive. The evaluation of the electrical potential confirms the conduction pathway with levels of electrical resistivity ranging from $10^4$ 'Ω·cm to $10^6$ 'Ω·cm for the elastomeric compounds making up the pathway for discharging electrostatic charges.

For the tyre of the invention, compared with the reference tyre, the viscoelastic sources have been reduced by 14%.

As a consequence of the reduction in viscoelastic loss sources, the calculation of the temperature field of the tyre of the invention shows a maximum level of 100° C., this corresponding to a difference of 10% compared with the reference tyre. This difference is sufficient for a significant improvement in the endurance of the tyre of the invention by extending its lifetime by around 30%.

The invention has been presented for a tyre for a construction plant vehicle, but it can actually be extrapolated to other types of tyre.

The invention claimed is:

1. A tire for a heavy vehicle of construction plant type, the tire comprising:
    a tread comprising two tread wings, the two tread wings being axial end portions that are axially separated by a tread central portion, and at least one tread wing being made of an electrically conductive elastomeric compound;
    a protective reinforcement, radially on an inside of the tread, comprising at least one protective layer made of metal reinforcers coated in an electrically conductive elastomeric coating compound, the protective layer being bordered at each of its axial ends by an edging rubber having a curved width $L_{GBS1}$ and being made up of an electrically conductive elastomeric compound;
    a working reinforcement, radially on an inside of the protective reinforcement, comprising at least two working layers made of metal reinforcers coated in an elastomeric coating compound;
    two sidewalls connecting the two tread wings to two beads that are intended to come into contact with a mounting rim via a bead layer made up of an elastomeric compound; and
    a carcass reinforcement connecting the two beads together, passing via the two sidewalls, and comprising at least one carcass layer made of metal reinforcers coated in an electrically conductive elastomeric coating compound, wherein each compound has a viscoelastic loss tgδ defined as being a ratio of a viscous shear modulus to an elastic shear modulus, the moduli being measured at a frequency of 10 Hz at a temperature of 60° C. and each compound is characterized by static stiffness measurements at 10% deformation and at 100% deformation according to a standard NFT 46-002 of September 1988, wherein an elastomeric compound of the tread central portion has a composition based on an elastomeric matrix comprising at least one diene elastomer and on a reinforcing filler predominantly comprising a filler covered at least partially with silica, with a dispersion of the reinforcing filler in the elastomeric matrix having a Z score greater than or equal to 70, wherein the edging rubber of the at least one protective layer is at least partially in contact with the electrically conductive elastomeric coating compound of the at least one protective layer and with the axially closest tread wing, wherein a Shore A hardness of the edging rubber is greater than or equal to 60, wherein the static stiffness modulus of the edging rubber at 10% deformation is greater than or equal to 4.5 MPa, wherein the static stiffness modulus of the edging rubber at 100% deformation is greater than or equal to 2.0 MPa, and wherein electrical resistivities of the elastomeric compound of the at least one tread wing, of the elastomeric coating compound of the at least one protective layer, of the elastomeric coating compound of the at least one carcass layer, of the elastomeric compound of the bead layer, of the elastomeric coating compound of the working layers, and of the elastomeric compound of the edging rubber of the at least one protective layer, respectively, are at most equal to $10^6$ Ω·cm, such that the at least one tread wing, the edging rubber of the protective layer, the elastomeric coating compounds of the at least one protective layer, the working layers, and the at least one carcass layer, and the elastomeric compound of the bead layer, respectively, constitute a preferential conductive pathway for the electric charges between ground and a rim when the tire is mounted on the rim and in contact with the ground.

2. The tire according to claim 1, wherein the edging rubber of the at least one protective layer has a curved width $L_{GBS1}$ at least equal to 100 mm and at most equal to 350 mm.

3. The tire according to claim 1, wherein the edging rubber of the at least one protective layer has a thickness at least equal to 3 mm and at most equal to 20 mm, measured at its middle along a direction normal to a curve of a carcass.

4. The tire according to claim 1, wherein the elastomeric compound of the tread central portion has a viscoelastic loss with a value at most equal to 0.065.

5. The tire according to claim 1, wherein the elastomeric compound of at least one tread wing is an electrically conductive rubber composition based on at least polyisoprene, on a crosslinking system, and on at least one reinforcing filler comprising carbon black, having a BET surface area at least equal to 110 m$^2$/g and a content at least equal to 30 phr and at most equal to 80 phr.

6. The tire according to claim 1, wherein the elastomeric compound of each sidewall has a rubber composition based on at least one blend of polyisoprene, natural rubber or synthetic polyisoprene, and polybutadiene, on a crosslinking system, and on a reinforcing filler, at an overall content at most equal to 45 phr, and comprising carbon black, at a content at most equal to 5 phr, and, predominantly, silica, at a content at least equal to 20 phr and at most equal to 40 phr.

* * * * *